(12) United States Patent
Ketcham

(10) Patent No.: US 6,212,206 B1
(45) Date of Patent: Apr. 3, 2001

(54) METHODS AND COMPUTER EXECUTABLE INSTRUCTIONS FOR IMPROVING COMMUNICATIONS IN A PACKET SWITCHING NETWORK

(75) Inventor: Carl Ketcham, Taylorsville, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/035,727

(22) Filed: Mar. 5, 1998

(51) Int. Cl.$^7$ ........................................................ H04J 3/06

(52) U.S. Cl. ............................................. 370/516; 370/216

(58) Field of Search ................................... 370/516, 232, 370/233, 234, 235, 252, 253, 260, 263, 270, 519, 353, 356, 396, 517, 261, 508, 518

(56) References Cited

U.S. PATENT DOCUMENTS

| | | | | |
|---|---|---|---|---|
| 5,623,483 | * | 4/1997 | Agrawal et al. ...................... | 370/253 |
| 5,640,388 | * | 6/1997 | Woodhead et al. ................... | 370/468 |
| 5,768,527 | * | 6/1998 | Zhu et al. ............................. | 709/231 |
| 5,790,543 | * | 8/1998 | Cloutier ................................ | 370/395 |
| 5,966,387 | * | 10/1999 | Cloutier ................................ | 370/516 |
| 6,044,091 | * | 3/2000 | Kim ...................................... | 370/508 |

* cited by examiner

Primary Examiner—Douglas Olms
Assistant Examiner—Phirin Sam
(74) Attorney, Agent, or Firm—Workman, Nydegger & Seeley

(57) ABSTRACT

Software and methods are provided for improving contemporary communications between two or more terminal locations of a packet switched network. In a packet switched network incoming packets are stored in buffers until, as in a video conference, playback of the packets occurs. As described herein, a concerted method between storing packets in buffers and adjusting the playback of the packets at a destination terminal locations is provided. In a preferred embodiment, a jitter time is set that estimates the arrival times between at least two packets at the destination terminal location. The jitter time corresponds to a set of conditions for the buffers receiving the incoming packets and for the playback of the packets on a display device. Thereafter, an actual arrival time between incoming packets is measured and compared against the jitter time estimate. If the measured time is faster than or slower than the jitter time estimate, packets are not being received into buffers as desired and adjustments to the jitter time and set of conditions are made. If the measured time is slower than the jitter time estimate, a rapid alteration to the buffers and playback is made. In one embodiment, the buffers are enlarged to accommodate the slower arriving packets and the playback is slowed down to make the video conference appear more natural. If the measured time is faster than the jitter estimate, gradual alterations are made. Over time, the buffers are adjusted to accommodate for the rapidly arriving incoming packets to prevent stockpiling in the buffers.

20 Claims, 4 Drawing Sheets

METHODS AND COMPUTER EXECUTABLE INSTRUCTIONS FOR IMPROVING COMMUNICATIONS IN A PACKET SWITCHING NETWORK

BACKGROUND OF THE INVENTION

1. The Field of the Invention

The present invention relates generally to packet switching networks. More specifically, the present invention relates to methods and computer executable instructions for improving communications between two or more terminal locations in a packet switching network. Even more specifically, the present invention relates to improving communications occurring contemporaneously between terminal locations such as occurs during a video conference.

2. The Relevant Technology

In general, a computer communications network is an infrastructure of switching nodes, access lines and trunks that interconnect a variety of terminal locations to one another for the purposes of allowing communications between the end users at the terminal locations. Frequently, these communications are contemporaneous, such as in a video conference, but many times are of entirely different time intervals, such as with electronic mail. The communications can assume a variety of forms. Some examples include the conveyance or exchange of information such as voice, text, data, graphics, video and documents.

Although many systems and methods are available that allow this communication between terminal locations of a network, three primary switching paradigms exist. Circuit switching is a method that physically connects the end users at the terminal locations before communication takes place. This is analogous to an ordinary phone call and a dedicated transmission path is often allocated for the duration of the call. Message switching exchanges messages between end users in a "store-and-forward" manner analogous to an ordinary postal system. Unlike circuit switching, method switching does not require the destination terminal location to be active at the same time that the originating terminal location is active. Packet switching is a method that exchanges packets, i.e., fragments of messages, between the terminal locations that are sequenced together at the destination location to form a complete message. With respect to video conferencing communications, packet switching is the typical paradigm.

In many packet switching networks (PSN's), the path traversed by a packet through the network is established during the call set-up procedures. This is commonly referred to as a virtual circuit PSN. In other PSN's, however, a service typically allows users to transmit individually addressed packets without the need for a call set-up. This is commonly referred to as a datagram PSN.

In either virtual circuit or datagram PSN's, numerous terminal locations are simultaneously sending packets to various other terminal locations throughout the network. In sending these packets, each packet is progressed through the network in its own distinctive route or transmission path. In general, this transmission path is established as follows: (i) a packet arrives at a switching node at some random time; (ii) the switching node which received the packet determines the next node in the transmission path to which the packet will be sent; and (iii) the switching node places the packet in a queue for transmission to that next node over some network trunk. As between switching nodes, however, one trunk may have a higher or lower transmission capacity as compared to another trunk. Thus, packets are known to arrive at the destination terminal location in a sporadic manner. This is a phenomenon known commonly as "latency."

In general, network latency is variable. Depending upon how many or how few factors contribute to the latency, the latency can range from a few fractions of a second with in-house networks to as many as 10 seconds, or more, with heavily bottle-necked networks.

Other factors also contribute to network latency. Such other factors include, but are not limited to: network volume causing congestion during peak hours; re-routing of packets when switching nodes become incapacitated; individual nodal processing capabilities; queuing delays caused by nodal software processes; protocol incompatibility between terminal locations and the network; performance capabilities of the terminal location and other similarly related factors.

However, with contemporaneous style communications between end users, such as video conferencing, latency can be extremely detrimental. For example, in a typical video conference, video and audio packets are continuously exchanged back-and-forth between two or more end users. Upon their arrival at the destination terminal location, the packets are stored in buffers until played on appropriate video and audio equipment.

If the latency is too long and a packet is caused to be delayed for more than about three-tenths of a second before being played, the video and/or audio communication from the originating terminal location will appear stilted to the end user at the destination terminal location. This frequently causes hesitation and/or "cross-talk" communications between both end users. As a result, the advantages of communicating by video conference will be diminished because the end users at both terminal locations must behave in an unnatural speaking manner to overcome this shortcoming.

Latency, in combination with the buffer size at the destination terminal location, is also problematic. For instance, when packets arrive, multiple packets are stored together in a singular buffer. If the latency is too long, some packet content may be omitted from inclusion within the buffer. Ultimately, the audio or video packet contents will not be played at the destination terminal location and the communication will appear incomplete. Again, hesitation and/or cross-talk can result.

As such, some prior art video conferencing devices attempt to control the buffer size. In these devices, the buffer size is set by the end user(s) during initialization processes such as the conference call set-up. Often, the end user(s) are unaware of the implications of buffer size and choose a buffer size in a haphazard manner. This leads to inaccurate buffer size selections. Moreover, in most of these devices, once the buffer size is selected, adjustments cannot be made. If the latency is too long, the end users must suffer through communications having omitted audio and/or video.

One prior art device, however, does provide for a change in buffer size. Yet, with this device, the buffer size may only be increased. Also, this increase is essentially instantaneous and causes either an audible or visual jerk, or both.

Accordingly, it is desirous to overcome the problems of latency experienced in PSN's. Ultimately, this will improve communications between terminal locations therein, especially for contemporaneous style communications like video conferencing.

OBJECTS AND SUMMARY OF THE INVENTION

It is, therefore, an object of the present invention to provide improved communications between terminal locations in a packet switched network.

It is another object of the present invention to provide software and methods that overcome the effects of latency in packet switched networks.

It is a further object of the present invention to provide software and methods that essentially eliminate end user intervention in establishing buffer sizes for the reception of audio and/or video packets during a video conference in a packet switched network.

It is yet another object of the present invention to provide software and methods that essentially eliminate any audio or visual jerks during a video conference in a packet switched network.

It is still yet another object of the present invention to provide software and methods that provide smooth audio and visual transitions during a video conference while corrective actions overcoming effects of latency are being implemented.

It is an even further object of the present invention to provide software and methods that allow for decreases in the sizes of buffers that receive audio and/or video packets during a video conference in a packet switched network.

In accordance with the invention as embodied and broadly described herein, the foregoing and other objectives are achieved by providing computer software and methods for improving communications between two or more terminal locations of a packet switched network. It is a feature of the present invention to improve specific methods of communicating between the terminal locations in networks exchanging packets of information by storing packets in adjusting-sized buffers and by adjusting the playback of the packets at the destination terminal location. Such specific methods of communicating particularly benefitted by the present invention includes communications that are contemporaneous between both terminal locations.

In a preferred embodiment, a jitter time attempting to account for network latency is set that estimates the arrival times between at least two incoming packets at a destination terminal location. The jitter time corresponds to a set of conditions for the buffers receiving the incoming packets and for the playback of the packets in a video conference. Thereafter, an actual arrival time between incoming packets is measured and compared against the jitter time. If the measured time is faster than or slower than the jitter time, packets are not being received into buffers as desired. This affects the playback of the packets. Then, alterations to the jitter time are made which corresponds to alterations in the set of conditions. In turn, the playback is improved.

If the measured time is slower than the jitter time, eventually, the buffers will not able to facilitate all incoming packets. As such, a rapid alteration to the buffers needs to occur. In one embodiment, the buffers are enlarged to accommodate for the slower-than-expected arrival times of the packets. The playback is also slowed down to make the video conference appear more natural.

If the measured time is faster than the jitter time, a gradual alteration to the set of conditions occurs to accommodate for the incoming packets arriving faster-than-expected. This will afford accommodation to incoming packets stockpiling in the buffers. The playback can remain as normal speed.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention in its presently understood best mode for making and using the same will be described and explained with additional specificity and detail through the use of the accompanying drawings in which.

DETAILED DESCRIPTION OF THE PREFERRED EMBODIMENTS

Figure 1:
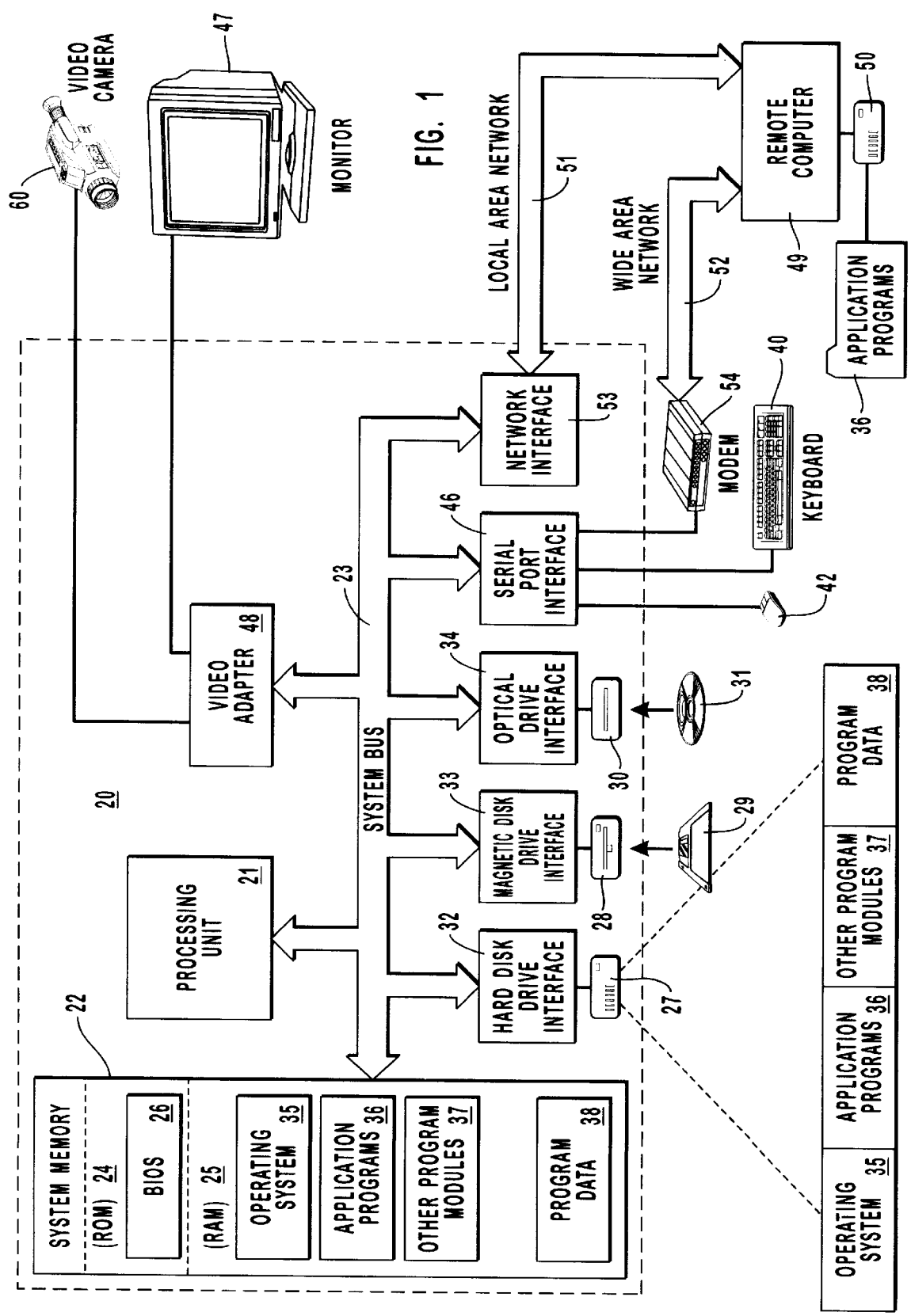
FIG. 1 is an exemplary computing system providing a suitable operating environment for the present invention.

The present invention provides software and methods for improving communications between two or more terminal locations of a network using packet switching or other switching means to convey and/or exchange packets of information from one terminal location to another. It is a feature of the present invention to improve specific methods of communicating between the terminal locations in networks exchanging packets by storing packets in adjusting-sized buffers and by adjusting the playback of the packets at the destination terminal location. Such specific communication methods particularly benefitted by the present invention include, but are not limited to, video conferencing, voice over IP (Internet protocol), Internet audio or other audio or video communication methods occurring contemporaneously between terminal locations.

As used herein, "packet" or "information packet" means a group of bits transmitted from an originating terminal location across a communications link or a network, such as a packet switching network, for reception and playback at a destination terminal location. The group of bits approximates a portion of a message. A plurality of packets together forms a complete message. The packets may contain video information, audio information, header information, textual information, graphic information or other information useful to either an end user at a terminal location, to the link or network itself for prioritizing or routing or to the computing system configuration at the terminal location.

In accordance with the present invention, diagrams are used herein to illustrate either the structure or processing of embodiments used to implement the systems and methods of the present invention. Using the diagrams in this manner to present the invention, however, should not be construed as limiting of its scope but merely as representative. As discussed in greater detail below, the embodiments of the present invention may comprise a special purpose or general purpose computer comprising various computer hardware.

Embodiments also within the scope of the present invention include computer readable media having executable instructions or data fields stored thereon. For brevity, computer readable media having computer executable instructions may sometimes be referred to as "software" or "computer software." Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic disk storage devices, or any other medium which can be used to store the desired executable instructions or data fields and which can be accessed by a general purpose or special purpose computer. Combinations of the above should also be included within the scope of computer readable media. Executable instructions exemplarily comprise instructions and data which cause a general purpose computer, special purpose computer, or special purpose processing device to perform a certain function or group of functions.

Further contemplated are a hierarchy of storage devices that are available to the system. Such storage devices may comprise any number or type of storage media including, but not limited to, high-end, high-throughput magnetic disks, one or more normal disks, optical disks, jukeboxes of optical disks, tape silos, and/or collections of tapes or other storage devices that are stored off-line. In general, however, the various storage devices may be partitioned into two basic categories. The first category is local storage which contains information that is locally available to the computer system. The second category is remote storage which includes any type of storage device that contains information that is not locally available to a computer system. While the line between these two categories of devices may not be well defined, in general, local storage has a relatively quick access time and is used to store frequently accessed data, while remote storage has a much longer access time and is used to store data that is accessed less frequently. The capacity of remote storage is also typically an order of magnitude larger than the capacity of local storage.

FIG. 1 and the following discussion are intended to provide a brief, general description of a suitable computing environment in which the invention may be implemented. Although not required, the invention will be described in the general context of computer-executable instructions, such as program modules, being executed by a "computer." Generally, program modules include routines, programs, objects, components, data structures, etc. that perform particular tasks or implement particular abstract data types. Moreover, those skilled in the art will appreciate that the invention may be practiced with other computing system configurations other than a computer, including hand-held devices, multi-processor systems, microprocessor-based or programmable consumer electronics, network PCs, minicomputers, computer clusters mainframe computers, and the like. Since the invention is practiced in distributed computing environments, tasks may also be performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional "computer" 20. The computer 20, also representative of the foregoing various other computing system configurations, is exemplary of a computing system configuration at any of a variety of terminal locations in an environment that transmit or receive information packets. As such, computer 20 may sometimes be referred to as a destination terminal location, originating terminal location or, simply, terminal location. The computer 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, may be stored in ROM 24. The computer 20 may also include a magnetic hard disk drive 27 for reading from and writing to a hard disk, not shown, a magnetic disk drive 28 for reading from or writing to a removable magnetic disk 29, and an optical disk drive 30 for reading from or writing to removable optical disk 31 such as a CD-ROM or other optical media. The hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, computers often include other peripheral output devices (not shown), such as speakers and printers. During a video conference, both peripheral input and output devices such as speakers and microphones are frequently employed to transmit and receive audio information of the conference participants. A video camera 60 that captures images of the conference participants is also employed and is typically connected to the system bus 23 via the video adapter 48.

The computer 20 operates in a networked environment using logical connections to one or more other terminal locations, such as remote computer 49. Remote computer 49 may be a personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in offices and enterprise-wide computer networks such as intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In the networked environment, program modules depicted relative to the computer 20, or portions thereof, may be stored in the remote memory storage device. It will be appreciated that the network connections shown are exemplary and other means of establishing a communications link between the terminal locations may be used. In the event that a network is used between the terminal locations, network switching nodes, network trunks, access lines and other similar related well known equipment is used to facilitate the connections, although not shown.

Whichever network or communications link is used between the various computers or terminal locations, it should be appreciated that in accordance with the present invention, information packets are exchanged there between. In such a link or network, the exchange of information packets will be referred to herein as a "packet switching network," "PSN" or "packet network." In a packet network, the information packets may be the exclusive means of exchanging information but are not required to be. Frequently, this exchange of packets in the PSN is accomplished by "interleaving" processes well known in the art.

Figure 2:
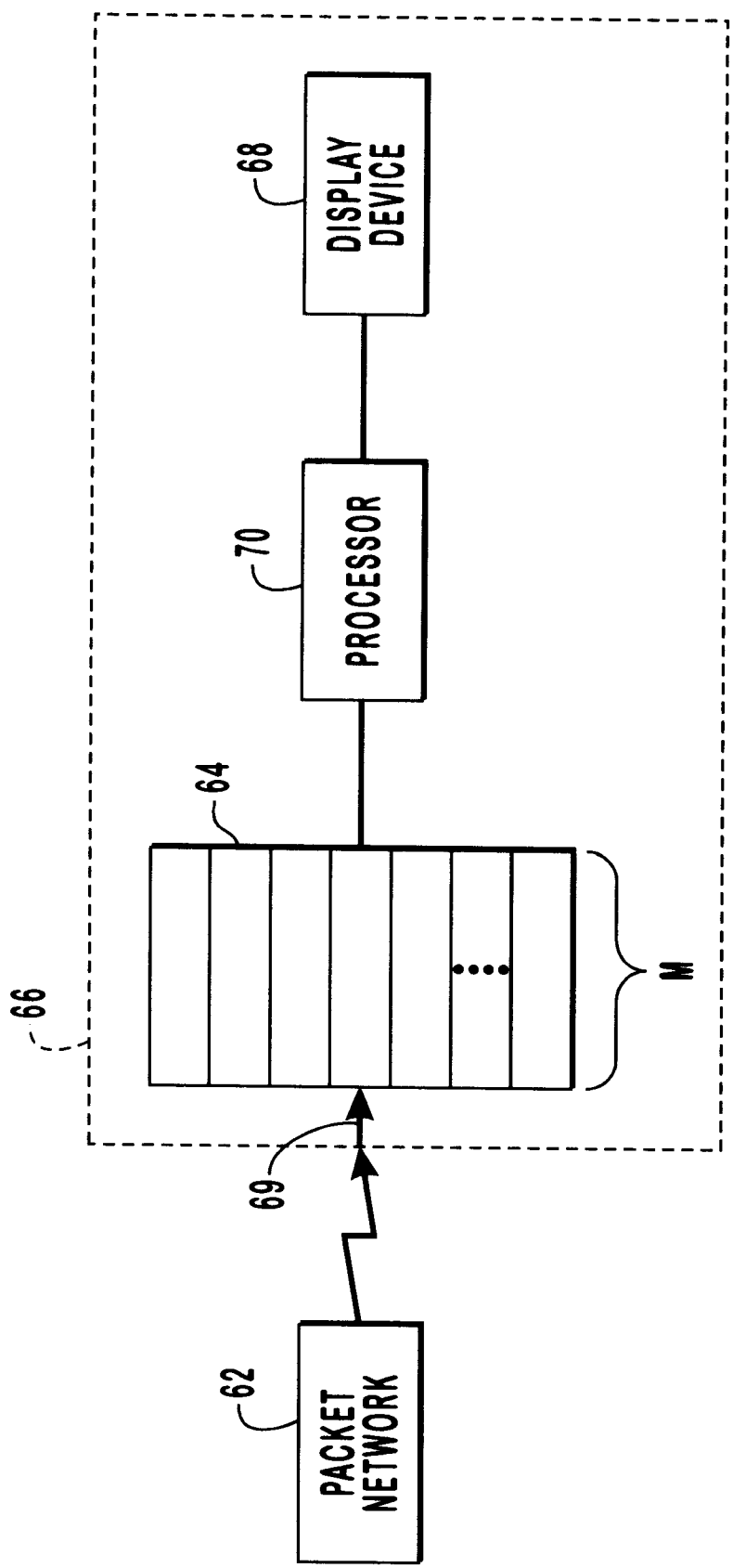
FIG. 2 is a block diagram of an exemplary method of storing incoming packets in buffers upon their reception at a destination terminal location in a packet switched network.

With reference to FIG. 2, a block diagram is used to show how packets are received and played at a terminal location. In general, a plurality of packets are received from an originating terminal location across a packet network 62 and, upon arrival, are stored in a plurality of buffers 64 at a destination terminal location 66. The packets are stored in the buffers 64 until such time as they are played on a display device 68.

In the event that the communications between the originating and destination terminal locations are not contemporaneous, such as with electronic mail, the transmission and storage of the packets in buffers 64 is not problematic. This is because when an end user at the destination terminal location 66 desires to view the packets, all packets have already been received at the destination terminal location, are readily available and can be played in sequence without suffering from the adverse effects of network latency. As such, these embodiments are not addressed within the context of the present invention.

Whereas, in the event that the communications between originating and destination terminal locations are contemporaneous, such as in a video conference, the buffers only temporarily store the packets before transferring them to the display device for playing. As described in the background section, these embodiments are severely impacted by network latency. It is towards these embodiments that the present invention is directed.

At the destination terminal location, each buffer 64 has an accompanying buffer size, M, associated therewith. Since an average packet transmitted in a packet network is about 1000 bytes of information and because multiple packets can be stored in a single buffer, an average buffer size is multiple thousands of bytes large. Preferably the buffers 64 are housed as part of the system storage 22 (FIG. 1) and may be a part of either the local or remote storage, or both.

During use, packets are temporarily stored in buffers 64 until such time as they are to be played on a display device 68. The cycling of packets from the buffers to the display device is preferably a circular queuing method performed by a software pointer 69 well known in the art. In the event that the packets comprise audio information, the display device is preferably a speaker configuration. In the event that the packets comprise video information, the display device 68 is preferably a monitor configuration such as monitor 47 (FIG. 1).

Before being played on a display device, the packets may be prepared for display by a processor 70. An example of a processor 70 includes, but is not limited to, a video decompressor in the event the packets contain video information. Since packets often arrive non-sequentially, the processor 70 is further configured to arrange the packets in their order of playback as determined by their time stamp arranged on the packet. A real time or relative time clock is sometimes also provided to assist the processor.

Figure 3:
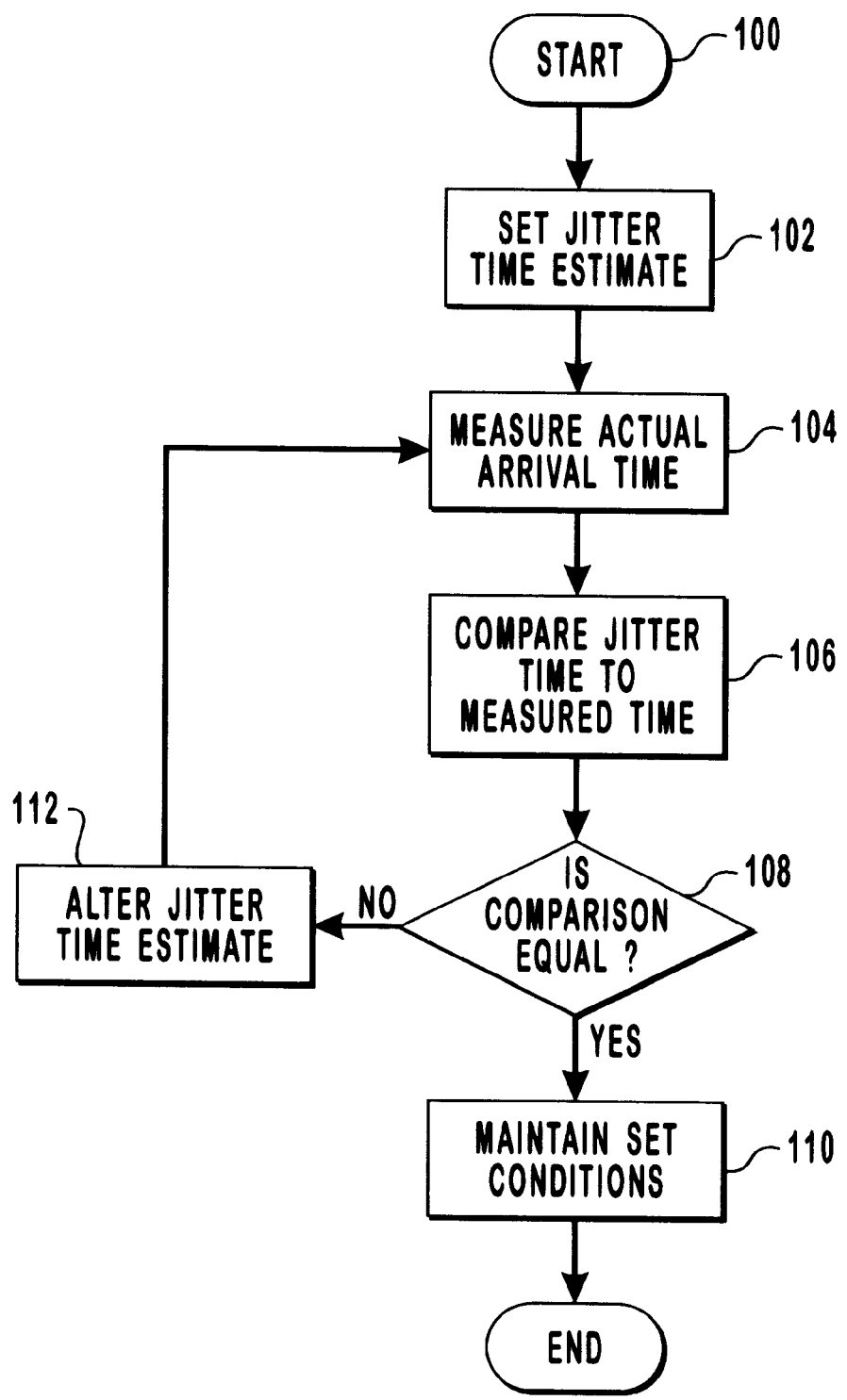
FIG. 3 is a flow diagram of the hierarchical operation of improving communications between terminal locations in a packet switched network in accordance with the present invention.

With reference to FIG. 3, a flow diagram of a hierarchical operation for improving communications between the terminal locations of a packet network is depicted generally as 100. Preferably, the flow diagram is implemented in a terminal location as computer-executable instructions of a computer-readable medium. The first step for improving communications is to estimate and set a jitter time 102. As used herein, "jitter time" means variations in the arrival time between incoming packets, i.e., spacing, at the destination terminal location. Thus, the jitter time estimate is the variation in the expected arrival time between incoming packets although no packets have yet been received. Typically, the jitter time between incoming packets is about 8 msec. As such, 8 msec is one preferred estimate.

In setting the jitter time estimate 102, an end user may manually input the estimate into the computer with various input/output devices Preferably, the jitter time estimate is established as computer executable instructions upon the initialization of method 100. In this manner, the end user is essentially eliminated from having to intervene in the initialization process. This extends the usability of this invention between numerous end users because no working knowledge of jitter time and/or packets is necessary in order to use the invention. The jitter time estimate may be stored as part of the computer system memory.

Whatever value is set for the jitter time, a corresponding set of conditions is automatically instituted for the buffers and the playback of the packets at the display device 68. Preferably, the set of conditions are optimized for the appearance of "natural" communications between the end users at the terminal locations. An exemplary set of conditions that facilitates natural communications includes, but is not limited to: an appropriate buffer size, M, for the buffers; an appropriate number of buffers 64 actually used to store incoming packets; an appropriate queuing cycle for sending the packets from the buffers 64 to the display device 68; an appropriate arrangement process for sequencing the packets for playback at the display device; and an appropriate playback speed to prevent end users from hesitating or cross-talking as described in the background section. Actual buffer sizes, speeds, arrangement processes and so on are not provided herein because they are all variable, adjustable according to various penchants and well known in the art. Similar to the jitter time, the set of conditions can be set by an end user but is preferably instituted as computer executable instructions without requiring any end user intervention.

Once the jitter time estimate is set and incoming packets begin arriving at the destination terminal location, an actual arrival time between packets is measured at step 104. This actual arrival time, also referred to as the measured time, may be measured with a real time clock that tags packets as they arrive or with an elapsed timer that indicates relative time between incoming packets. In either event, if only one packet arrives, no actual arrival time can be measured. Thus, at least two incoming packets are needed to obtain an actual arrival time, and at least three incoming packets are needed to measure jitter.

Once the actual arrival time is measured, the jitter time estimate is compared to the measured time at step 106 to determine whether the comparison is different or equal 108. Preferably, this comparison is performed by computer executable instructions that subtracts between jitter time and the measured time. Such instructions are well known and are not described herein in detail.

As used herein, "equal" comparison means substantially equal times between the jitter time and the measured time. This distinction is preferably made on the order of thousandths of a second because the jitter time estimate itself is typically on the order of milliseconds. The equality of time may also be defined as some other fraction of time.

If the comparison is equal, this means that packets are arriving when expected and the buffer sizes, the playback speeds and other elements in the set conditions are performing in accordance with an optimized natural communication between end users. Thus, no changes to the set conditions are necessary and, at step 110, the set of conditions are maintained without change.

If the comparison is not equal, with either the measured time being faster or slower than the jitter time estimate, the packets are arriving at either a faster or slower than expected time. Accordingly, the communications between the terminal locations is no longer optimized. Thus, an alteration to the jitter time needs to be effectuated at step 112 so that a corresponding alteration to the set conditions for the buffers and playback will be instituted. In this manner, the set of conditions, once optimized, for natural appearing communications becomes updated so that natural appearing communications can remain in place.

The particular process for altering the jitter time estimate will be described in detail below, but once altered, the actual arrival time between incoming packets is again measured at step 104 to determine whether the alteration has improved or worsened the jitter time estimate. Although not likely, it is possible that a repeating loop of continually altering the jitter time estimate can occur without ever achieving the condition of maintaining the set of conditions at step 110. Nonetheless, continual alterations of the jitter time estimate will still improve upon communications between end users at terminal locations.

Figure 4:
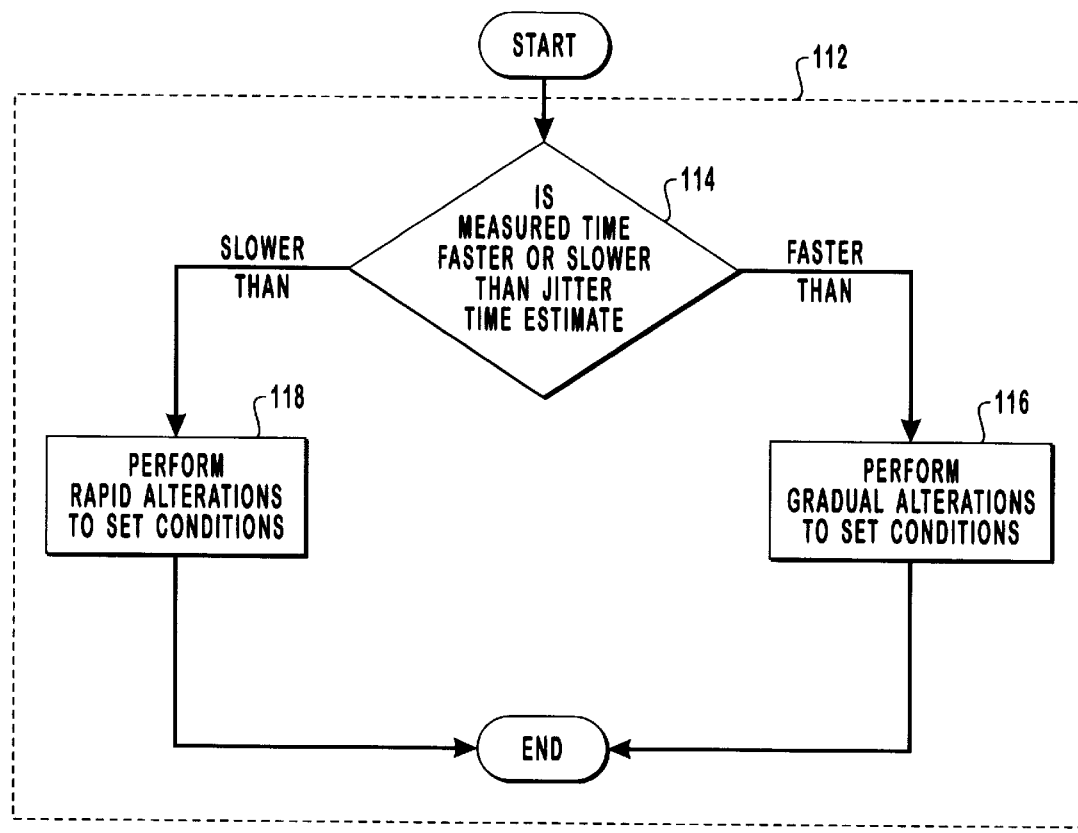
FIG. 4 is a flow diagram of adjusting the jitter time in accordance with the present invention.

With reference to FIG. 4, alterations to the jitter time estimate at step 112 begins with a determination, at step 114, about whether the measured time is faster than or slower than the jitter time. If the measured time is faster than the jitter time, i.e., a number less than the jitter time estimate, packets are arriving at the destination terminal location faster-than-expected. No matter what buffer size, M, is selected, the buffers 64 will be filled faster than if the measured time is equal to the jitter estimate. Eventually, if no change to the set of conditions occurs, the buffers will become full and will not be able to receive any further incoming packets. If this happens, some packets will be omitted from playback as is the case with many prior art arrangements. Since the buffer size, M, is typically large enough to accept numerous packets and because many such buffers are used, this situation is not critical when initiating a jitter time alteration. This is because the time to completely fill the buffers is long enough to require only gradual changes to the set conditions.

Thus, at step 116, gradual alterations to the set of conditions are performed. Gradual changes to the set of conditions will prevent potential jerking type playback of the packets, for example, as is done in the prior art. An example of a gradual change to the set of conditions includes adding some additional number of buffers to accommodate stockpiling incoming packets.

If the measured time is slower than the jitter time, i.e., a greater number than the jitter time estimate, packets are arriving at the destination terminal location slower-than-expected Buffers 64 will be filled slower than if the measured time is equal to the jitter estimate. This situation requires a more rapid alteration to the jitter time and corresponding set of conditions. This is because when it is time for the packets to be played to keep the communications naturally flowing between the end users, there might not be any packet in the buffer available for playing. If this occurs, a large time delay between packets being played will ensue and stilted communications will result.

To prevent this, rapid alterations to the set of conditions are performed at step 116. Preferably rapid alterations means to make adjustments before the arrival of the next incoming packet. In contrast, gradual adjustments can be effectuated over the course of receiving many incoming packets.

Figure 5:
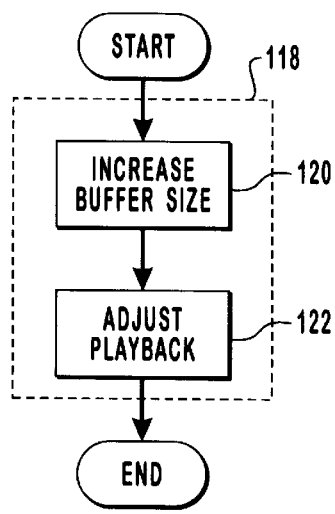
FIG. 5 is an exemplary flow diagram of rapidly performing adjustments to the set of conditions invoked when the measured time is slower than the jitter time.

With reference to FIG. 5, exemplary rapid alterations to the set of conditions includes: (i) increasing each of the buffer sizes, M, at step 120; and (ii) altering the playback of a portion of the packets, at step 122. Both of these alteration can be effectuated by computer executable instructions.

Increasing the buffer sizes will accommodate the longer arrival time between incoming packets. This will ensure that incoming packets will have a storage place in the buffers no matter when they arrive. Altering the playback will provide a way to trick the senses of the end users, i.e., hearing and vision, into thinking that communications are normal. Thus, preventing stilted communications. An example of altering the playback is a slowing of the playback speed of packet. Since an average end user can only detect changes that occur in playback speeds of greater than about three-tenths of a second, each packet playback can be slowed up to about three-tenths of a second.

Numerous other alterations to the playback can be effectuated. For example, if the jitter time estimate was 8 msec and the measured time was 12 msec, an average participant in a video conference would notice a singular playback adjustment of 4 msec. Thus, a series of four frames could each be slowed by about 1 msec. Alternatively, two frames could be slowed by about 2 msec each. In both of these examples the average participant would not notice the change and the communication between the end terminals would not be affected. Heretofore, such corrections are unknown.

It should be appreciated that in video conferencing, both video and audio packets are received at the destination terminal location and that the playback between those packets needs to be synchronized. This prevents situations where an end user's lips are seen moving on the video display device but no sound is heard emanating from the audio display device. Accordingly, the processor can be used to synchronize the packets in methods well known in the art.

Advantageously, the foregoing also presents an improved method of communicating that does not affect or change the network compatibility with existing transmission standards such as the H.323 umbrella standard well known in the art.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed computing environment having an originating terminal location sending a plurality of packets to a destination terminal location, a method for improving communications between said terminal locations, at said destination terminal location the steps comprising:
    estimating a jitter time between said packets arriving at said destination terminal location;
    defining a set of conditions corresponding to said jitter time for at least one buffer, said one buffer for temporarily storing said packets;
    measuring an actual arrival time between said packets arriving at said destination terminal location;
    comparing said jitter time to said actual arrival time to determine whether said set of conditions should be altered, said set of conditions including a size of said one buffer; and
    when said actual arrival time is slower than said jitter time, increasing said size of said one buffer.

2. A method for improving communications according to claim 1, wherein said step of comparing said jitter time to said actual arrival time comprises the step of subtracting between said jitter time and said actual arrival time.

3. A method for improving communications according to claim 1, further comprising the step of playing back said packets at a playback speed while slowing down said playback speed for a portion of said packets.

4. A method for improving communications according to claim 1, wherein said actual arrival time is substantially equal to said jitter time further comprising the step of maintaining said set of conditions for said one buffer.

5. A method for improving communications according to claim 1, wherein said actual arrival time is faster than said jitter time further comprising the step of adding additional buffers to accommodate stockpiling said packets.

6. A computer readable medium having computer executable instructions for performing the steps as recited in claim 1.

7. A computer readable medium according to claim 1, wherein said actual arrival time is substantially equal to said jitter time further comprising computer executable instructions for performing the step of maintaining said buffer size of said buffer.

8. A method of communicating between a plurality of terminal locations in a packet network, comprising the steps of
    establishing a communications link between said terminal locations;
    at one of said terminal locations, sending a plurality of information packets; and
    at another of said terminal locations,
    i) estimating an arrival time between at least two of said information packets;
    ii) receiving at least two of said information packets;
    iii) measuring an actual arrival time between said at least two of said received information packets;
    iv) storing said at least two of said received information packets in a buffer;
    v) comparing said arrival time to said actual arrival time to determine whether a size of said buffer should be altered; and
    vi) when said actual arrival time is slower than said arrival time, increasing said size of said buffer.

9. A method of communicating according to claim 8, further comprising the step of playing back said information packets at a playback speed while slowing down said playback speed for a portion of said information packets.

10. A method of communicating according to claim 8, at said another of said terminal locations wherein said actual arrival time is substantially equal to said arrival time further comprising the step of maintaining said size of said buffer.

11. A method of communicating according to claim 8, at said another of said terminal locations wherein said step of comparing said arrival time to said actual arrival time to determine whether a size of said buffer should be altered further comprises the step of subtracting between said arrival time and said actual arrival time.

12. A method of communicating according to claim 8, at said another of said terminal locations further comprising the step of speeding up a playback of a portion of said information packets.

13. A computer readable medium having computer executable instructions for performing the steps at said another of said terminal locations as recited in claim 8.

14. In a video conference between at least two terminal locations in a packet network, a method for improving the playback of information packets containing audio or video information sent from one of said terminal locations and received by the other of said terminal locations, at said other of said terminal locations the steps comprising:
    estimating a jitter time between said information packets sent from said one of said terminal locations;
    defining a size for a buffer, said buffer for storing said information packets upon receipt from said one of said terminal locations until said information packets are played at said playback speed
    defining a playback speed for said information packets corresponding to said jitter time;
    measuring an actual time between said information packets sent from said one of said terminal locations;
    comparing said jitter time to said actual time to determine whether said playback speed should be altered; and
    altering said size of said buffer if said jitter time and said actual time are not substantially equal.

15. A method of improving the playback of information packets according to claim 14, wherein said actual time is slower than said jitter time further comprising the step of increasing said size of said one buffer.

16. A method of improving the playback of information packets according to claim 14, wherein said actual time is slower than said jitter time further comprising the step of slowing down said playback speed for a portion of said information packets.

17. A method of improving the playback of information packets according to claim 14, wherein said actual time is substantially equal to said jitter time further comprising the step of maintaining said playback speed.

18. A computer readable medium having computer executable instructions for performing the steps at said other of said terminal locations as recited in claim 14.

19. A computer readable medium having computer executable instructions for performing the steps of:

storing a jitter time that estimates the time between reception of a plurality of packets; establishing a buffer size in a computer for a buffer corresponding to said jitter time;

comparing said jitter time to an actual arrival time between said packets to determine whether said buffer size should be altered; and when said actual arrival time is greater than said jitter time, increasing said buffer size of said buffer.

20. A computer readable medium according to claim 19, further comprising computer executable instructions for performing the step of slowing down a playback of a portion of said packets.

* * * * *